Oct. 1, 1946. W. OWEN ET AL 2,408,530
APPARATUS FOR CUTTING PRISMS
Filed April 11, 1944 8 Sheets-Sheet 6

Inventors
WILLIAM OWEN and
IVAN G. PECK

By Olen E. Bee
Attorney

Fig. 14.

Oct. 1, 1946.                W. OWEN ET AL                    2,408,530
                       APPARATUS FOR CUTTING PRISMS
                  Filed April 11, 1944          8 Sheets-Sheet 8

Inventors
WILLIAM OWEN and
IVAN G. PECK
By Olen E. Bee
Attorney

Patented Oct. 1, 1946

2,408,530

UNITED STATES PATENT OFFICE 2,408,530

APPARATUS FOR CUTTING PRISMS

William Owen, Pittsburgh, and Ivan G. Peck, Ford City, Pa., assignors to Pittsburgh Plate Glass Company, a corporation of Pennsylvania Application April 11, 1944, Serial No. 530,576

12 Claims. (Cl. 125—14)

1

This invention relates to cutting apparatus and it has particular relation to apparatus designed to cut or saw off pieces of glass from a slab or sheet.

One object of the invention is to provide an improved apparatus for cutting off pieces of glass of predetermined shape from a body of glass.

Another object of the invention is to provide an improved apparatus for cutting prisms from a slab or plate of glass.

Another object of the invention is to provide an improved mechanism for holding and directing cutting elements to a plate of glass.

Another object of the invention is to provide an improved chuck structure for positioning and repositioning a glass plate for successively cutting off prisms of symmetrical form.

Another object of the invention is to provide an improved method of sawing a glass plate into the form of prisms.

A conventional method of cutting relatively thin or even very thick glass involves the use of a diamond cutter, or scoring wheel, which merely scores or cuts the glass surface. The glass is then cracked or snapped along the scored line. This operation which is referred to as running cuts is practical for ordinary plate or sheet glass, although the snapped edges are not entirely uniform. The snapped edges follow generally a plane at right angles to the surface of the glass. However there is no definite control as to direction of breaking and the edges may be ragged.

When it is desired to cut glass at angles to the plate surface, scoring the glass and running cuts in the manner mentioned above do not apply. For example, in making prisms, a plate or slab of glass must be cut entirely through its body in order to provide the proper shape. A practical structure embodying our invention for this purpose includes an apparatus which cuts a slab of glass in predetermined planes by employing rotatable disk cutters which are so designed as to saw the glass effectively without marring the prism sides formed thereby. A specially designed chuck is included in the apparatus for alternately presenting the glass to the cutter in such manner that the plane of one cutting operation is disposed at right angles, or at any other angle desired, to the plane of the successive cutting operation. The glass to be cut is prepared in the form of slabs of rectangular cross-section and the cutters are applied to the edges or narrower sides of the slab.

2

In practicing the invention a stationary frame 10 is provided with upright front and rear sides 12 in which two swinging cutter frames 14 are supported, and wherein each cutter frame is mounted upon horizontal bearings 15 carried by the sides 12. The bearing axes of the two cutter frames are parallel and disposed in the same horizontal plane. Each cutter frame includes a lower relatively heavy or weighted cradle section 16 upon which an electric motor 20 is mounted in such manner that the weight of each motor is carried below the axes of the bearings 15 and the center of gravity of the entire swinging frame is below such bearings. A horizontal driven shaft 21 of each motor is axially aligned with respect to the bearings 15 of the cutter frame upon which the motor is mounted.

Transmission pulleys 24 and 25 which are rigidly secured upon each motor shaft 21 and upon an upper horizontal shaft 26, respectively, of each cutter frame, are connected by means of flexible transmission members 27, trained thereabout. The latter can be in the form of V-belts, chains, or the like.

Figure 8:
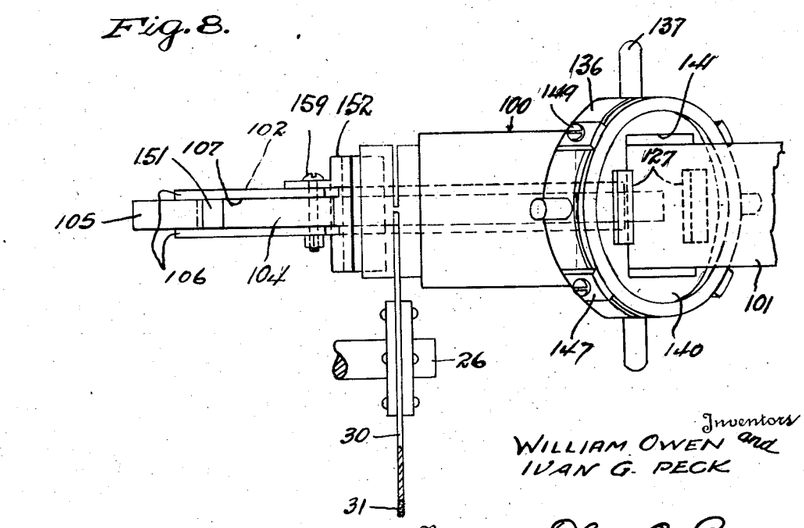
Fig. 8 is a plan of the chuck and associated elements with portions being omitted to emphasize details.

Each cutter shaft 26 is rotatably mounted in horizontal bearing supports 29 formed in the upper portion of the swinging frame 14, and is disposed parallel to the motor shaft 21. The end of each cutter shaft 26 opposite the transmission pul'ey 25 rigidly supports a metal disk cutter 30 having an outer cutting section 31 (Fig. 8) in which very hard abrasive material capable of cutting or sawing glass is incorporated. The cutting portion of each disk 30 is infused primarily with diamond particles. Arcuate casings or housings 34 are rigidly mounted upon the bearing supports 29 and partially surround the disk cutters in such manner that they cover side portions thereof while opposed cutting edges project therefrom. These casings include cover plates 35 secured to the casing body by means of bolts 36.

It is to be noted that the disk cutters 30 are disposed in the same vertical plane at the same distance from the respective axes of the bearing supports 15 and they are therefore movable in arcs toward and away from each other about these bearing supports.

Figure 3:
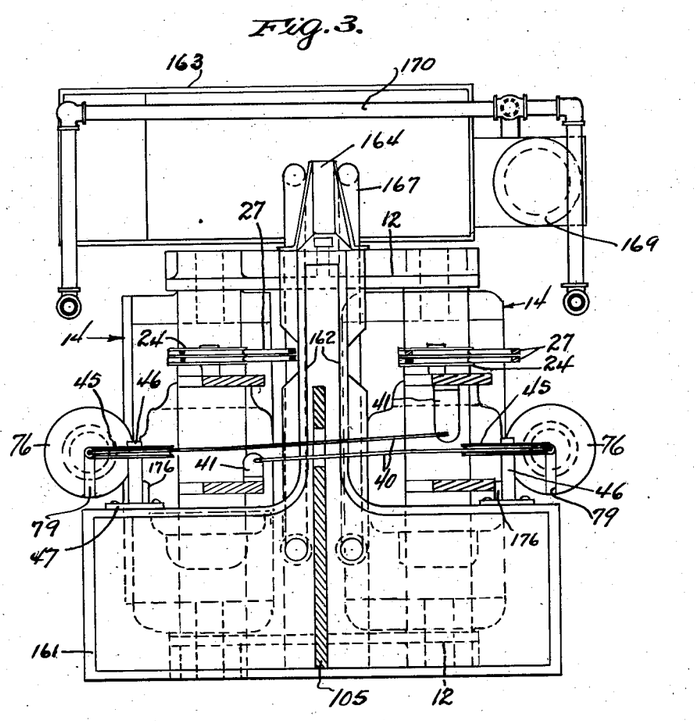
Fig. 3 is a combined horizontal section and plane of the apparatus, the section being taken substantially along the line III—III of Fig. 2.
Figure 12:
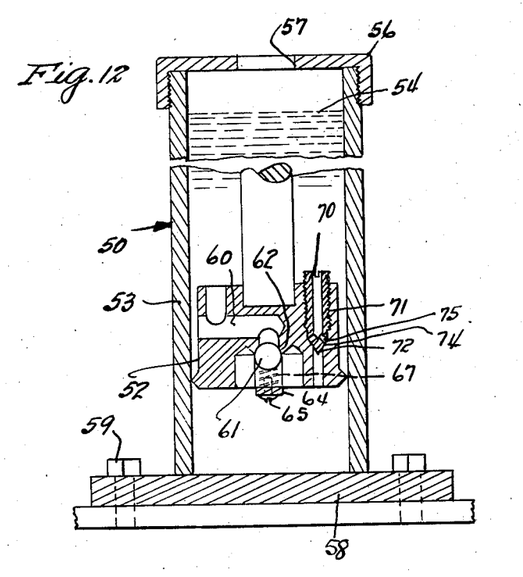
Fig. 12 is a fragmentary vertical section of a dash-pot arrangement employed in the apparatus, the section being taken substantially along the line XII—XII of Fig. 2.
Figure 13:
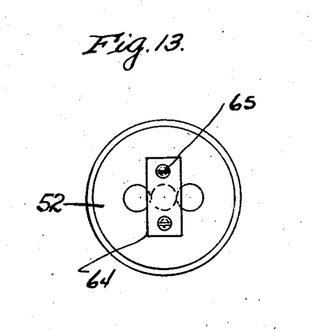
Fig. 13 is a bottom plan of the piston employed as a part of the dash-pot.

A pair of cables 40 are connected to brackets 41 (Fig. 3) mounted rigidly upon the upper portions of the swinging frames 14 and these cab'es are trained over pulleys 45, which are mounted rotatably on stud shafts 46, each rigidly carried upon a plate 47. Stationary portions of the frame 10 support these plates which are bolted thereon. Each cable 40 runs horizontally from a pulley 45 at one side of the upper frame to an upper portion of the swinging frame 14 disposed adjacent the opposite side of the apparatus. Each cable at its lower end is connected to a dash-pot 50 (Figs. 12 and 13) which includes a vertical rod 51 having a piston 52 rigidly secured thereon and operable in a vertical cylinder 53 containing a suitable fluid 54. The cable is fastened to the upper end of the rod 51. The cylinder 53 is covered by a cap 56 having an opening 57 to slidably receive the rod 51 and this cap is screw-threaded on the upper cylinder end. The lower portion of the cylinder is in the form of a relatively large disk base 58 through which bolts 59 are disposed to secure the cylinder rigidly upon a floor or other suitable support.

An irregular passage 60 communicates with opposite sides of the piston 52 through the body thereof. One-way flow of the fluid through this passage is controlled by a ball valve 61 held against a valve seat 62 formed in the piston around the passage. A plate 64 which is secured by screws 65 to the bottom of the piston traverses the passage without closing it, and a coil spring 67 is compressed between the plate 64 and the valve 61 normally to maintain the latter closed against the seat 62.

A bleeder valve 70 is adjustably screw-threaded in a passage 71, also extending through the piston body for communication from the upper to the lower side thereof. This valve is in the form of a small tube having a lower beveled wall 72 adapted to be closed against a beveled seat 74 in the passage. When the valve is seated it closes openings 75 formed through the beveled wall of the valve. Weights 76 which are notched, as indicated at 79, are strung upon upper portions of the vertical rods 51 upon which they are supported by a collar 80 that is rigidly mounted upon the rod. These weights, through their connections to the upper portion of the swinging cutter frames, are sufficiently heavy to overcome the weight of the motors and the lower weighted portions of the swinging frames 14 and thus force the cutter disks toward each other. The relative movement of the cutters toward each other is regulated by the amount of fluid permitted to flow through each bleeder valve 70 and the resistance of the fluid to such movement.

A chuck 100 for supporting a glass slab or plate 101 to be cut by the disk cutters 30 is mounted upon a vertical bearing disk 102 partially cut away, as indicated at 103, and rotatable about a horizontal axis in a segmental internal bearing 104 formed in a vertical plate 105 that is rigid with the apparatus frame 10. Radial flanges 106 forming parts of the segmental bearing disk 102 define a bearing channel 107 between which marginal edges of the upright frame plate 105 defining the bearing 104 are disposed.

Figures 4, 9, 10:
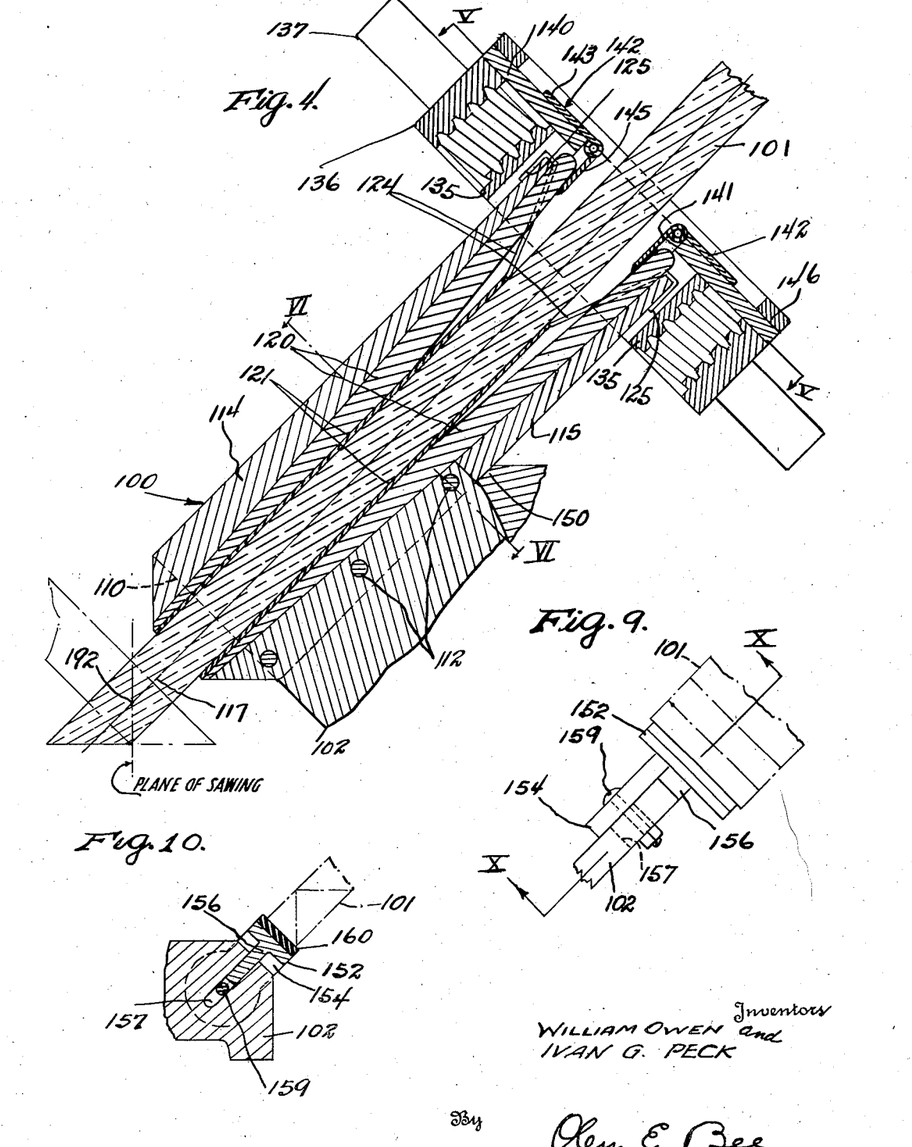
Fig. 4 is a vertical section of a work-clamping and positioning chuck included in the apparatus.
Fig. 9 is a fragmentary plan of a glass positioning buffer and its mounting.
Fig. 10 is a fragmentary cross-section taken substantially along the line X—X of Fig. 9.
Figure 11:
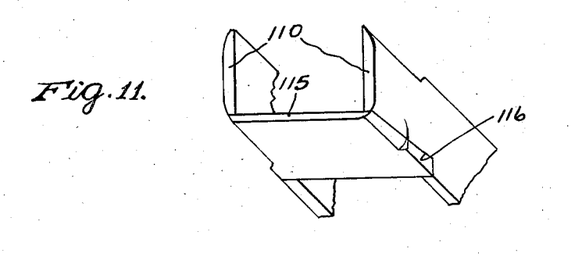
Fig. 11 is a fragmentary perspective of portions of the chuck.

The bearing disk 102 includes a radial shelf 109 which is wider than the thickness of the disk and supports side plates 110 rigidly bolted thereto along their lower edges, as indicated at 112. Upper and lower plates 114 and 115 are secured between the side plates and are welded thereto to define a rigid box-like structure. The lower plate 115 (Fig. 11) is fitted in notched portions 116 adjacent the rear ends of the side plates 110 and fits at its front or lower edge against an edge of the shelf 109. The inner or upper surface of the plate 115 constitutes in effect a continuation of the upper surface of the shelf 109, and these surfaces are the same plane. The opposite inner surfaces of the plates 114—115 converge symmetrica'ly toward the center line, indicated at 117 (Fig. 4), of the chuck. Thus this center line includes the axis of rotation of the bearing disk 102. Opposed wedges 120 having their outer sides flush with the inner surfaces of the plates 114—115 at substantially their clamped or closed position are so designed that their inner surfaces are disposed in substantially parallel planes equally spaced from the center line of the chuck when clamped on opposite sides of the glass slab 101. Relatively thin liners 121 in the form of metal plates lie flush against the inner parallel surfaces of the wedges 120 and the outer liner ends are bifurcated to form outwardly bent arms 124 which are further bent or hooked, as indicated at 125, over the outer extremities of the upper and lower plates 114 and 115. The outer end portions 126 of the wedges are reduced and each reduced portion lies between the arms 124 of one of the liners. The glass slab 101 fits between these liners.

Centering strips 127 are disposed along the inner sides of the plates 110 to engage opposite edges of the glass plate 101. Set screws 129 threaded through the side plates 110 provide for refinements of adjustment in precisely centering the glass between the wedges. These strips which are loosely disposed between the wedges are sufficiently narrow to permit requisite movement of the wedges toward each other, and to accommodate glass slabs of different widths. The outer ends of the strips are bent over the outer ends of the side plates 110, as indicated at 130, to prevent such strips from being accidentally displaced.

Figure 5:
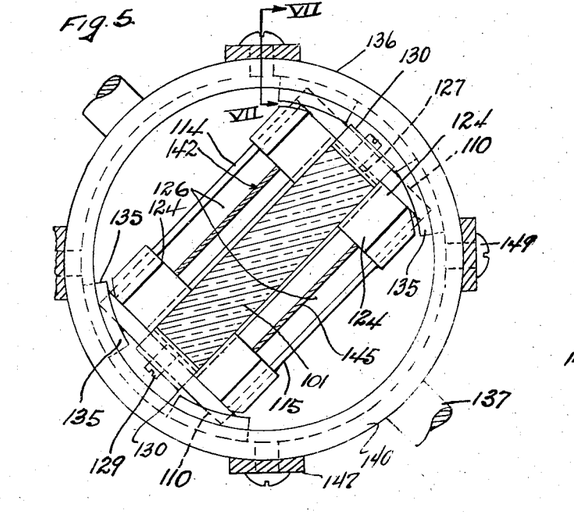
Fig. 5 is a combined plan and cross-section of the chuck, the section being taken substantially along the line V—V of Fig. 4.
Figure 6:
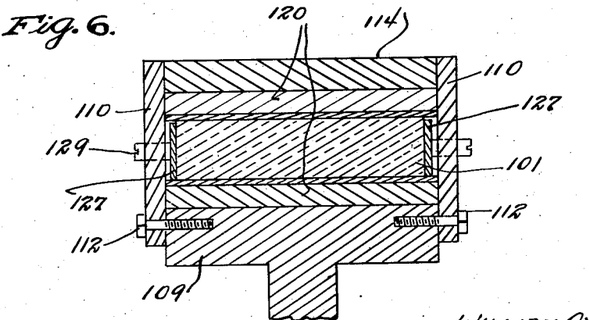
Fig. 6 is a cross-section of the chuck taken substantially along the line VI—VI of Fig. 4.
Figure 7:
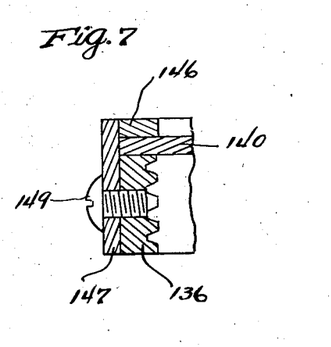
Fig. 7 is a fragmentary cross-section of a turret portion of the chuck taken substantially along the line VII—VII of Fig. 5.

The side plates 110 and the upper and lower plates 114—115, which define a rigid box-like structure, support at their outer end portions segmental lugs 135 (Fig. 5) welded thereon to provide a screw-threaded structure upon which an internally threaded turret 136 is rotatably mounted. The axis of the turret is coincident with the center line 117. Handles 137 on the turret facilitate its manual rotation upon the chuck which is rigidly mounted, as indicated above, on the bearing disk 102.

A circular plate or bearing disk 140 mounted upon the upper side of the turret has a central opening 141 therein through which the glass extends and in which oppositely disposed hinges 142 are mounted by welding one wing 143 of each hinge to the upper side of the disk. The other wings 145 of the hinges extend downwardly and are welded to the outer end portions of the respective wedges 120. It is to be noted that the outer sides of the wedges 120 are sloped away from the planes of the opposite sides of the glass plate 101.

A retaining ring 146 which covers the outer marginal portions of the disk 140 is held in properly spaced relation to the turret by means of lugs 147 welded to the ring and bolted, as indicated at 149, to the outer walls of the turret. The ring 146, lugs 147, and upper side of the turret 136 thus provide a bearing which is rotatable relative to the disk 140 which is positively connected to the wedges in the manner specified. From this description it will be apparent that, in response to rotation of the turret, the wedges 120 are moved in substantially axial directions along the inclined opposed surfaces of the upper and lower plates 114—115, while at the same time they are pivotable upon the hinges 142 so that they can be pivoted to spread their lower ends and to release the gripped glass plate. Conversely these wedges can clamp the plate of glass disposed between them after such wedges are forced downwardly and at the same time their lower end portions are forced toward each other by the converging inner surfaces or walls of the plates 114—115. Since the wedges are symmetrical, glass plates of different thicknesses can be centered with equal facility.

Figure 1:
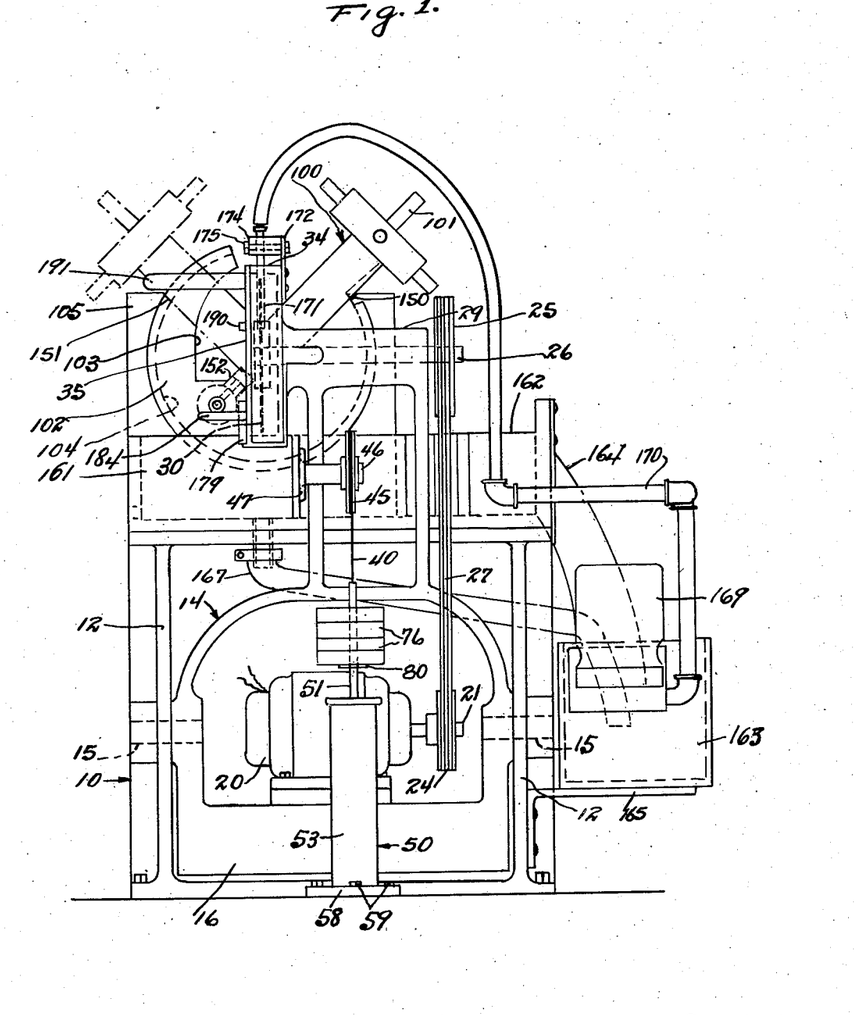
Fig. 1 is a side elevation of a cutting apparatus.
Figure 2:
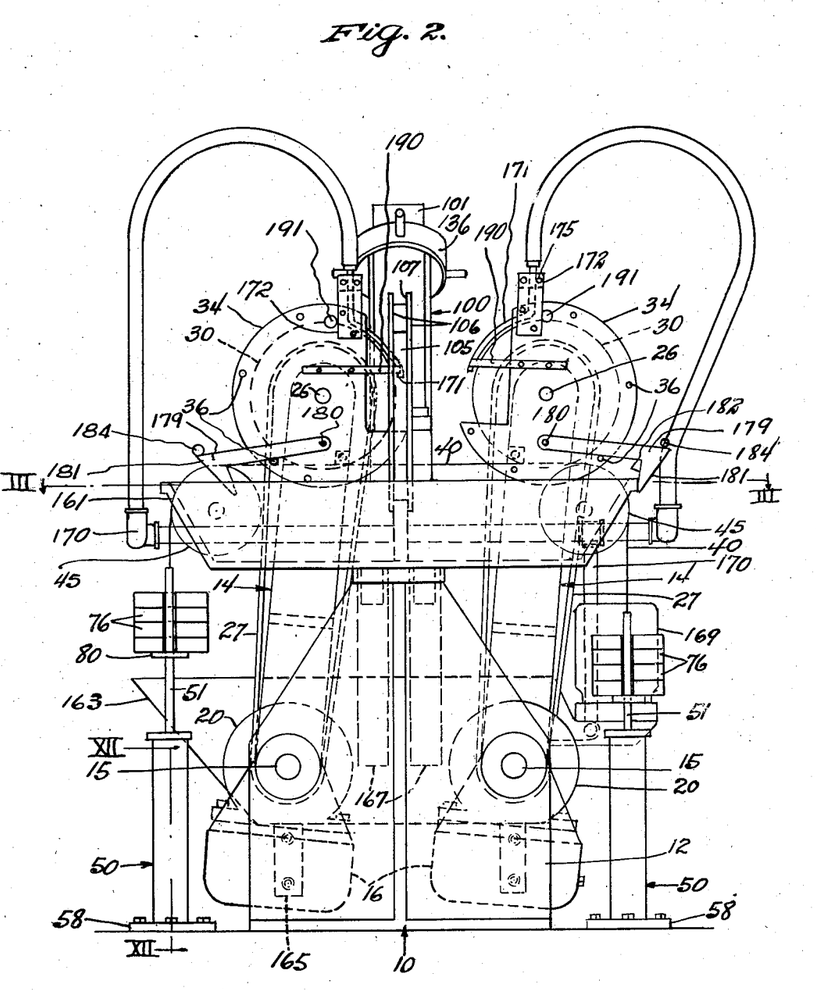
Fig. 2 is a front elevation of the structure shown in Fig. 1.

It will be observed that the rigid structure of the chuck (Figs. 1 and 4) rests upon a stop 150 formed on the stationary upright bearing plate 105. This stop is so positioned that the chuck and, in consequence its center line 117, is disposed at an angle of 45° to the vertical. By bodily shifting the chuck by the handles 137, it can be thrown to the position shown in broken lines of Fig. 1 and through an angle of 90°. The upper plate 114 then rests upon a stop 151 which also positions the chuck at an angle of 45° to the vertical. In either position the handles of the turret can be operated to loosen or tighten the wedges 120 with respect to the glass disposed therebetween.

In order to gage the glass plate, a buffer 152 (Figs. 8–10) is mounted upon an inner portion of the bearing disk 102. This buffer includes a side plate 154 and a central flange 156, the latter of which is disposed in a slot 157 formed in the disk. By manipulating a bolt 159 extending through the side plate and through the slot, the buffer can be adjusted toward and away from the end of the chuck. A pad 160 of rubber, or like material, covers the face of the buffer and is cemented or otherwise firmly secured thereto.

The upper portion of the apparatus frame rigidly supports a basin 161 immediately below the disk cutters 30 in such manner that the upright chuck supporting plate 105 traverses it and extends centrally of a trough portion 162 leading laterally from the basin. The trough and upright plate are disposed substantially midway between the swinging cutter frames 14. The trough 162 extends to the rear side of the apparatus and communicates with a rear tank 163 through a spout 164 attached to, and leading downwardly from, the trough. Suitable brackets 165 carry the tank upon the frame. The basin 161 also communicates with the tank 163 by means of conduits 167 attached at their inner ends to the lower side of the basin 161. Their outer ends are disposed in the tank 163.

A pump 169 of conventional construction which is mounted upon the tank 163 communicates with the interior thereof and with fluid supply pipes 170. Upper end portions of the pipes are mounted upon metal nozzles 171, which are attached to the housings 34 of the respective cutter disks 30. A bracket 172 supports each nozzle which is bolted in place in connection with a block 174 in which the nozzle and bolts 175 are mounted. The bolts 175 extend through the block and bracket to provide a rigid mounting. The nozzles are directed downwardly immediately adjacent the perimeter of the disk cutters 30 and to such position that continuous streams of water, or other fluid, can be directed to the points of contact between the disk cutters 30 and the glass plate. Stops 176 formed upon the plates 47 (Fig. 3) which supports the stud shafts 46 are disposed in the path of movement of the cutter frames 14 against which they rest in their open or outwardly disposed positions. As these frames 14 approach such position latches 179, which are secured at their inner ends upon the respective cutter housings by means of bolts 189, automatically latch behind the upper opposite edges of the basin 161. The outer end portions of the latches have beveled surfaces 181 which ride over the edges of the basins and then the end of the latch drops to catch latch shoulders 182 behind these edges. The latches can be released manually by manipulating handles 184 welded thereon. Each latch 179 is normally maintained in a substantially horizontal position by means of one of the housing assembling bolts 36 against which it normally rests.

In operating the apparatus so far described, the turret 136 is adjusted so as to permit the glass 101 to be inserted between the wedges 120. The glass is inserted to such position that its inner end rests against the buffer 152 and is centered by manipulating the set-screws 129, as well as by rotating the turret to tighten the wedges. Since the glass so positioned is ready to be cut, the operator releases the latches 179 to permit the disk cutters 30 to approach each other in the same plane and engage opposite edges of the glass under the force exerted by the weights 76. The cutters are thus urged from opposite directions against the glass as they are rotatably driven by the motors 20. The cutting or sawing operation thus initiated from opposite directions continues until a pair of stops 190 bolted on the cutter housings meet and arrest movement of the cutter frames toward each other. At the time of contact of the stops, the disk cutter edges are sufficiently spaced to avoid contact with each other. The glass is then almost entirely severed. By manipulating one or both of the handles 191 mounted rigidly on the housing 34, the cutter assemblies can be moved in the same direction until one of the cutters while still rotating cuts through the remaining portion of the glass. The operator then removes the severed piece of glass.

The disks 30 can be moved in either direction to finish the severing operation in this manner by one or the other cutters. Alternately, the operator can move one cutter frame to its open or inoperative position and secure it there by its latch 179, while the other cutter automatically completes the severing of the glass under the pressure exerted by the weights 76. The rate of cutting can be regulated by adjusting the bleeder valve 70. It will be noted that in severing the glass in this manner the plane of cutting is disposed at an angle of 45° to the center line 117 of the chuck.

Figure 18:
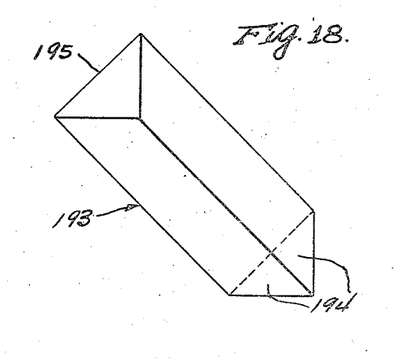
Fig. 18 is a perspective of a prism produced by the apparatus.

The turret 136 is then rotated to relieve the clamping action upon the sides of the glass to such extent that the latter can be slid forwardly until the extremity of the severed portion is positioned against the buffer 152. The chuck and disk 102 are then shifted 90° in the bearing 104 to the position shown in broken lines of Fig. 1. In this position of the chuck, the disk cutters are applied in the same manner as that described above. In connection with the second cutting action, as in the first, the plane of cutting is vertical, but since the chuck 100 has been shifted through an angle of 90° from its position resting upon the stop 150 to a position in which it rests upon the stop 151, the plane of cutting for the second operation will be at right angles to the first plane of cutting. Likewise, since the axis of rotation of the bearing disk 102 and the axis of rotation of the turret intersect substantially at the center of the area of cutting, as indicated at 192, the cutting of the glass in alternate positions of the chuck produces prisms 193, such as that shown in Fig. 18. Each prism comprises equal faces 194 disposed at right angles to each other and a third face 195 disposed at angles of 45° to the equal faces. After the prisms have been cut in this manner they are ground and polished to finish the product.

Figure 14:
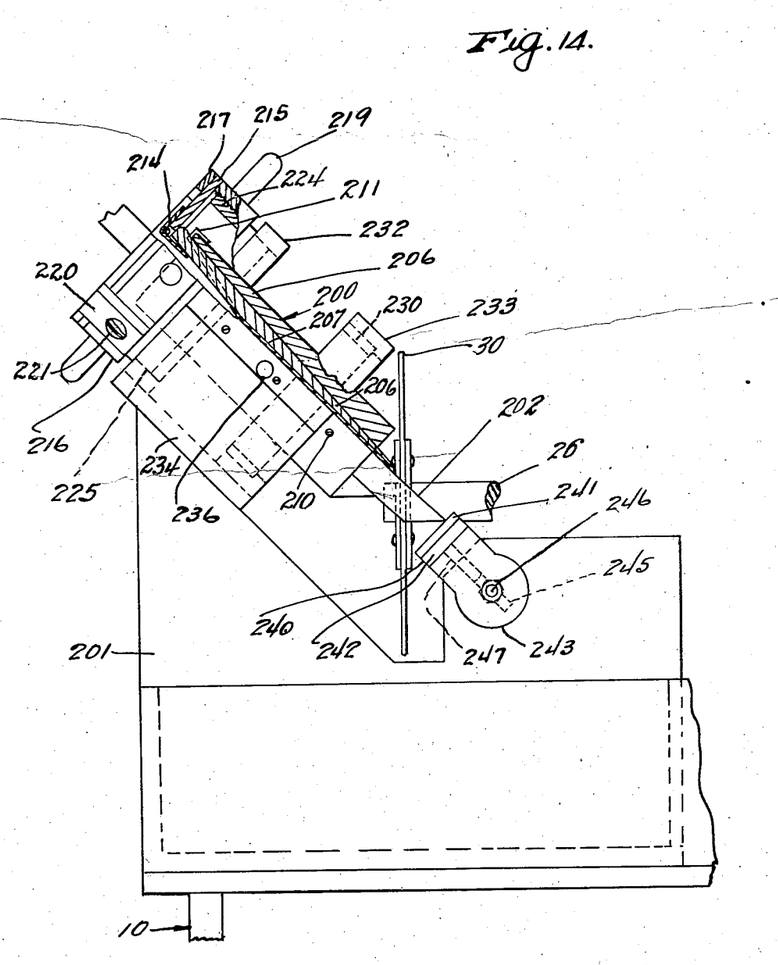
Fig. 14 is a combined side elevation and vertical section of an alternate form of chuck structure.
Figure 15:
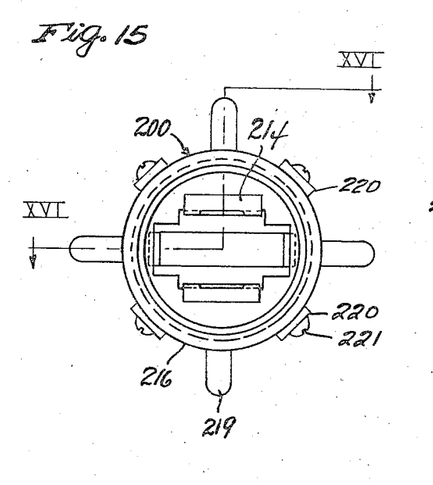
Fig. 15 is a plan of the chuck shown in Fig. 14.
Figure 16:
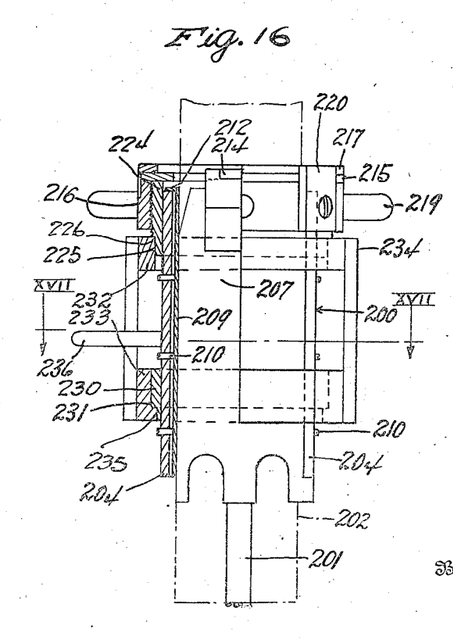
Fig. 16 is a combined plan and longitudinal section of the chuck shown in Fig. 14, the section being taken substantially along the line XVI—XVI of Fig. 15.
Figure 17:
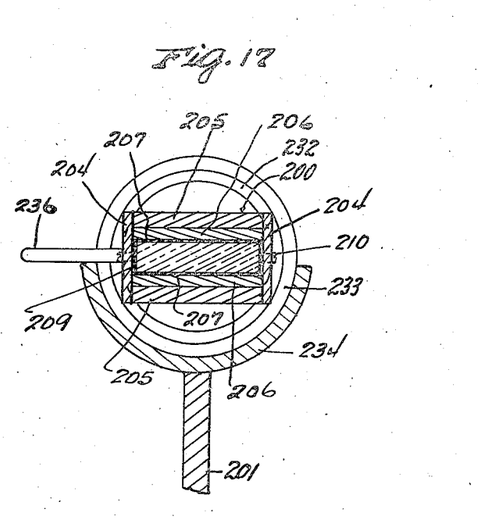
Fig. 17 is a cross-section taken substantially along the line XVII—XVII of Fig. 16.

An alternate arrangement of glass positioning chuck 200 is shown in Figs. 14–16 in which a rigid plate 201 is mounted on the apparatus frame 10 in the same manner as the plate 105 and corresponds substantially thereto. The chuck 200 presents a glass plate 202 to the disk cutters 30 at substantially the same position as that shown with reference to the construction already described, and hence repetition of description of the cutters with their motors and control devices is not necessary.

The chuck 200 comprises side plates 204 and upper and lower plates 205 rigidly secured together by welding, or the like, to enclose opposed slidable wedges 206 that are faced with liners 207 between which the glass plate is inserted. Metal centering strips 209 are disposed loosely adjacent the side plates of the chuck and are adjustable against the edges of the glass by means of set-screws 210, which are threaded through these plates. The liners 207 and centering strips 209 are bent or hooked over the outer ends of the plates 205 and 204, as indicated at 211 and 212, respectively. Outer ends of the wedges are reduced in width and are rigidly connected by welding to hinges 214, which are, in turn, rigidly connected to a circular bearing disk 215 rotatable axially of a turret 216 between an outer retaining ring 217 and the turret. Handles 219 mounted on the turret provide for its manual manipulation. Lugs 220, welded to the ring 217 at spaced locations around its circumference, are secured to the turret by means of screws 221 and serve to space the ring properly from the turret. The bearing disk is thus rotatably supported between the ring and the turret and rotates about an axis coincident with the axis of the turret.

The plates 204 and 205 define a hollow body upon the outer end of which an externally screw-threaded collar 224 is rigidly secured by welding, or otherwise, in such manner that the collar is axially aligned with the center line of the chuck. The turret 216 is screw-threaded upon the collar for the purpose of moving the wedges 206 between the plates 205, thus clamping the glass in the same manner as that previously described with reference to the operation of the chuck 100.

The collar 224 extends a sufficient distance inwardly beyond the edge of the turret to provide for a cylindrical bearing surface 225 formed thereon, which is axially aligned with the turret. A bearing shoulder 226 is formed in connection with the formation of the bearing surface.

An additional bearing collar 230, which is welded to the inner or lower end portion of the box structure of the plates 204 and 205, is provided with a bearing shoulder 231 adjacent its inner edge. The bearing portions of the collars 224 and 230 which are axially aligned are rotatably mounted in bearing rings 232 and 233 which are, in turn, mounted rigidly by welding in a substantially semi-cylindrical bearing support 234. The latter constitutes a rigid portion of, or is welded upon, the upright frame plate 201. A narrow bearing flange 235 is formed on the lower inside edge of the lower ring 233 to cooperate with the shoulders 226 and 231 in maintaining the chuck in its proper position in the bearing. The chuck 200 is supported upon the plate 201 at an angle of 45° to the vertical.

A handle 236 which is rigidly secured by welding or otherwise to one of the side plates 204 extends laterally therefrom and can be manipulated to rotate the chuck about its axis through an angle of 180°. The angle through which the chuck is rotatable is gaged by the semi-cylindrical support 234, the opposite edges of which serve as stops at the limits of the 180° movement. After the disk cutters 30 sever the glass, as indicated in Fig. 14 and as previously described, the chuck is rotated through an angle of 180° about its axis, and then the turret is operated to permit resetting of the glass. In this manner alternate cuts through the glass will be at 90° to each other, although opposite edges of the glass are alternately presented to one of the cutters.

A buffer 240 similar to the buffer 152 is mounted upon the frame plate 201 and comprises a rubber facing 241 cemented to a flange 242 which constitutes a part of a side plate 243 disposed at right angles thereto. A slot or guide 245 in the plate 201 receives a bolt 246 which adjustably clamps the side plate 243 to the frame 201. A central guide flange 247 integral with the side plate 243 is guided in the slot to facilitate the adjustment of the buffer. This buffer operates in the same manner as the buffer 152 in gaging the position of the glass plate.

In connection with the operation of the several mechanisms described above, the glass plates can be sawed or cut at proper angles to produce the types of prism required. After the cutting operation has been completed the prisms, which are somewhat rough along their sawed surfaces, are subjected to finishing operations, such as grinding and polishing the surfaces until they exhibit the required reflecting characteristics.

Although illustrative forms of the invention have been shown and described in detail, it will be apparent to those skilled in the art that the invention is not specifically limited to such forms, but that various changes can be made therein without departing from the spirit of the invention or from the scope of the appended claims.

We claim:

1. A glass sewing apparatus comprising a pair of disk cutters disposed in substantially the same plane, means supporting said cutters for movement toward and away from each other in said plane, a support for positioning a glass slab between said cutters, means connected to the cutters and urging them toward each other against opposite portions of the glass slab, stops on the cutter supporting means to limit movement of the cutters toward each other and permitting concurrent movement of the cutters in the same direction after said stops engage each other, and power means connected to the cutters for rotatably driving them.

2. A glass sawing apparatus comprising a pair of abrasive disk cutters disposed in substantially the same plane for movement toward and away from each other in said plane, a support for positioning a glass slab between said cutters, swingable frames supporting the respective cutters and having weight members connected thereto to urge the cutters toward each other in cutting relation against opposite portions of the glass slab, bearing supports for the frames, retarding means operatively connected to the cutter supporting frames and yieldably disposed in opposition to the force exerted by the weight members during the cutting operation to determine speed of movement of the cutters toward each other, and power means connected to the cutters for rotatably driving them.

3. A glass sawing apparatus comprising a pair of cutters disposed in substantially the same plane, a pair of cutter supporting frames carrying the cutters toward and away from each other in operative relation in said plane, means for supporting a glass plate between said cutters, actuating means normally urging the cutter supporting frames toward each other to present the cutters in cutting relation to the glass from opposite directions, retarding means connected to the cutter frames to regulate rate of feeding of the cutters against the glass, and power means connected to the cutters for driving them in cutting relation while they move toward each other.

4. A glass sawing apparatus comprising a pair of cutters disposed in substantially the same plane, a pair of cutter supporting frames carrying the cutters toward and away from each other in operative relation in said plane, means for supporting a glass plate between said cutters, actuating means normally urging the cutter supporting frames toward each other to present the cutters in cutting relation to the glass plate from opposite directions, dash-pot units connected to the cutter frames and normally urging them toward each other in opposition to said actuating means to regulate the rate of feeding of the cutters against the glass plate, and power means connected to the cutters for driving them in cutting relation while they are moved toward each other.

5. A glass sawing apparatus comprising a pair of cutters disposed in substantially the same plane, means supporting said cutters for movement toward and away from each other in said plane, a chuck for supporting a glass plate between said cutters, reversible means operatively connected to said chuck for alternately presenting opposite portions of the glass plate to the cutters at substantially equal angles to said plane, means connected to the cutters for urging them toward each other against opposite portions of said plate, and power means connected to the cutters for driving them in cutting relation.

6. In a glass sawing apparatus, a pair of cutters disposed in substantially the same plane, a frame structure supporting said cutters for movement toward and away from each other in said plane, a chuck having a center line intersecting said plane at an angle of predetermined value, means in said chuck for gaging the work therein along said center line to a position to be severed by said cutters, said chuck and supporting frame including chuck shifting means for alternately presenting opposite portions of the work in said plane at angles equal to said angle of predetermined value, means connected to the cutters for urging them toward each other against opposite portions of the work held by the cutter, and power means connected to the cutters for driving them in cutting relation.

7. In a glass sawing apparatus, a pair of cutters disposed in substantially the same plane, frame structure supporting said cutters for movement toward and away from each other in said plane, a bearing in said frame structure having its bearing axis disposed at an angle to said plane, a chuck unit rotatable in said bearing and having a center line substantially coaxially disposed with respect to said bearing axis, stop means on the frame engageable with the chuck and limiting rotative movement thereof within an angle of 180° about said bearing axis to present opposite edges of the work in the chuck to the cutters and at equal angles to the plane of cutting, means associated with the chuck for gaging the work therein with respect to the plane of cutting and along the center line of the chuck, means connected to the cutters for urging them toward each other against opposite sides of the work, and power means connected to the cutters for driving them in cutting relation.

8. In a glass sawing apparatus, a pair of cutters disposed in substantially the same plane, frame structure supporting said cutters for movement toward and away from each other in said plane, a bearing in said frame structure having its bearing axis disposed at an angle to said plane, a chuck unit rotatable in said bearing and having a center line substantially coaxially disposed with respect to said bearing axis, stop means on the frame engageable with the chuck and limiting rotative movement thereof within an angle of 180° about said bearing axis to present opposite edges of the work in the chuck to the cutters and at equal angles to the plane of cutting, means associated with the chuck for gaging the work therein with respect to the plane of cutting and along the center line of the chuck, a buffer adjustably mounted on said chuck unit in substantial alignment with the center line of the chuck to gage the extent of advancement of the work to be cut after each cutting operation, means connected to the cutters for urging them toward each other against opposite sides of the work, and power means connected to the cutters for driving them in cutting relation.

9. In a glass sawing apparatus, a pair of cutters disposed in substantially the same plane, a frame structure supporting said cutters for movement toward and away from each other in said plane, a bearing in said frame having its bearing axis disposed in said plane, a chuck rotatable in said bearing and having a center line intersecting said bearing axis, stop means on the frame structure engageable with the chuck to limit movement of the latter about said bearing axis to positions of equal angular relation to said plane of cutting on opposite sides thereof, and stop means associated with the chuck for gaging the work therein along said center line and with respect to said plane of cutting, means connected to the cutters for urging them toward each other against opposite sides of the work, and power means connected to the cutters for driving them in cutting relation.

10. In a glass sawing apparatus, a pair of cutters disposed in substantially the same plane, a frame structure supporting said cutters for movement toward and away from each other in said plane, a bearing in said frame having its bearing axis disposed in said plane, a bearing disk cut away centrally and mounted in said bearing in a second plane disposed substantially at right angles to the plane of cutting, a chuck mounted upon said disk for movement therewith in said bearing and having a center line in said second plane intersecting said bearing axis, stop means on the frame engageable with the chuck to limit movement of the latter about said bearing axis to positions of equal angular relation to said plane of cutting on opposite sides thereof, stop means associated with the chuck for gaging the work therein along said center line and with respect to the plane of cutting, means connected to the cutters for urging them toward each other against opposite sides of the work, and power means connected to the cutters for driving them in cutting relation.

11. A chuck comprising an open ended, hollow body having opposed interior surfaces converging towards an open end of said body, opposed wedges having surfaces slidably engaging respectively said converging surfaces for movement toward and away from each other to grip and release a piece of work in response to sliding movement of the wedges in the body, lining sheets covering the inner surfaces of the wedges and connected to said body to permit sliding movement of the wedges with respect thereto, and actuating means adjustably mounted upon said body and engaging the wedges to move them along said converging surfaces.

12. A chuck comprising an open ended, hollow body having opposed interior surfaces converging towards an open end of the body, opposed wedges having surfaces slidably engaging respectively said converging surfaces for movement toward and away from each other to grip and release a piece of work in response to sliding movement of the wedges in said body, centering strips disposed in the body adjacent opposite edges of the wedges, means in the body movably engaging the strips to center the work in said body, and actuating means adjustably mounted upon said body and engaging the wedges to move them along said converging surfaces.

WILLIAM OWEN.
IVAN G. PECK.